United States Patent [19]

Sorimachi et al.

[11] Patent Number: 5,222,156

[45] Date of Patent: Jun. 22, 1993

[54] OBJECT INFORMATION PROCESSING APPARATUS

[75] Inventors: Kanehiro Sorimachi; Makoto Tamari, both of Yokohama, Japan

[73] Assignee: Canon Kabushiki Kaisha, Tokyo, Japan

[21] Appl. No.: 948,478

[22] Filed: Sep. 22, 1992

Related U.S. Application Data

[63] Continuation of Ser. No. 679,822, Apr. 1, 1991, abandoned, which is a continuation of Ser. No. 373,698, Jun. 30, 1989, abandoned, which is a continuation of Ser. No. 129,345, Nov. 27, 1987, abandoned, which is a continuation of Ser. No. 706,727, Feb. 28, 1985, abandoned.

[30] Foreign Application Priority Data

Mar. 9, 1984 [JP] Japan .................... 59-44920

[51] Int. Cl.$^5$ .................................. G06K 9/74
[52] U.S. Cl. ............................ 382/32; 381/1; 250/550; 354/408; 356/1
[58] Field of Search ............... 250/550, 558; 350/513, 350/130; 356/1, 4, 10, 12, 45, 376; 354/402, 403, 407, 408, 476, 482; 364/561; 382/1, 32

[56] References Cited

U.S. PATENT DOCUMENTS

| | | | |
|---|---|---|---|
| 3,274,914 | 9/1966 | Biedermann et al. | 354/408 |
| 3,295,106 | 12/1966 | Horn | 382/32 |
| 4,039,843 | 8/1977 | Glish, Jr. | 250/550 |
| 4,178,098 | 12/1979 | Asano et al. | 356/1 |
| 4,218,119 | 8/1980 | Schickedanz | 354/430 |
| 4,259,585 | 3/1981 | DiMatteo et al. | 250/558 |
| 4,391,513 | 7/1983 | Fujiki | 356/1 |
| 4,550,995 | 11/1985 | Toyama | 358/227 |
| 4,556,322 | 12/1985 | Wickman et al. | 356/1 |
| 4,556,986 | 12/1985 | Craig | 356/45 |
| 4,573,191 | 2/1986 | Kidode et al. | 382/1 |
| 4,636,627 | 1/1987 | Matsumara | 354/407 |
| 4,654,872 | 3/1987 | Hisano et al. | 382/1 |
| 4,716,434 | 12/1987 | Taniguchi et al. | 354/408 |

OTHER PUBLICATIONS

The Journal of the Institute of Television Engineers of Japan, vol. 34, No. 3, Mar. 1980, S 6.1.

*Primary Examiner*—Jose L. Couso
*Attorney, Agent, or Firm*—Fitzpatrick, Cella, Harper & Scinto

[57] ABSTRACT

An object information processing apparatus includes a focussing unit for focussing light information from an object point; a light transmission unit for transmitting the light information from the object point to the focussing unit via first and second optical passages; and mask units provided respectively in the first and second optical passages in the light transmission unit and formed respectively with predetermined patternings which are in negative and positive relation to each other. By virtue of the mask units, the light information from the object point is blocked into a plurality of distance informations from which distance patterns are obtained. The apparatus can recognize an object in three dimensions using the distance patterns. Since the apparatus has no mechanically movable parts and the light passed through the first and second optical passages is focussed side by side on a photosensor, a high resolution is obtained and mutual references of corresponding points of the object are readily obtained.

33 Claims, 9 Drawing Sheets

OBJECT INFORMATION PROCESSING APPARATUS

This application is a continuation of application Ser. No. 07/679,822 filed Apr. 1, 1991, which is a continuation of Ser. No. 07/373,698, filed Jun. 30, 1989, which is a continuation of Ser. No. 07/129,345, filed Nov. 27, 1987, which is a continuation of Ser. No. 06/706,727, filed Feb. 28, 1985, all now abandoned.

BACKGROUND OF THE INVENTION

1. Field of the Invention

The present invention relates to an object information processing apparatus which is simple in construction and capable of recognizing environments by using distance information.

2. Description of the Prior Art

Various techniques for recognizing environments by using visual sensors have been studied heretofore. Most of such techniques simulate the functions of human visual recognition in which distributional characteristics of the brightness and coloring of the environments are extracted out of signals obtained with a television camera and the extracted characteristics are compared with stored informations to perform such functions. As an example, there is known in the art a method for determining what an object is by analyzing the shape, border lines, colors, and shading of the object using a camera. The method, however, requires time in the order of minutes in order to recognize even a simple object such as a building block. Thus, it is impossible to effect real time processing, which results in hardships of practical applications. Another method has been proposed (for example, refer to the Journal of the Institute of Television Engineers of Japan, Vol. 34, No. 3, 1980). In the method, the distribution of distances to an object is measured by radiating a light flux through a slit. Still another method has been proposed in which the distance to an object in the environment is measured with an ultrasonic sensor. With the method basing upon the brightness distribution, however, it is difficult to recognize in the form of three dimensions the environments. Particularly in a light intercepting method using radiation of slit lights, although it is effective for the recognition of the three dimensional configuration, the amount of data to be processed is immense so that even with a relatively large computer, the time required for one frame processing amounts to from several ten seconds to several minutes. In addition, since it is necessary to move slit lights, movable mechanical parts must be incorporated which might cause the resultant precision to be somewhat uncertain. Besides, there brings about a problem that larger energy must be supplied to a slit light source in order to recognize brighter environments.

With the method using an ultrasonic sensor, it is difficult to narrow the beam of a radiated ultrasonic wave due to its essential properties. Consequently, there is a problem that it is hard to improve the resolving power for an image.

SUMMARY OF THE INVENTION

With the above problems in view, it is therefore an object of the present invention to provide an object information processing apparatus which three-dimensionally processes an object basing upon distance information and using a simple circuit arrangement.

It is another object of the present invention to provide an object processing apparatus which forms distance patterns by dividing an area photosensor into a plurality of predetermined regional blocks and calculating a distance information for each block.

It is a further object of the present invention to mount mask units at image focussing planes, both units being in predetermined positive and negative patterning relation to one another.

It is a still further object of the present invention to change the regional block so as to obtain a distance pattern from distance information respectively input to the predetermined regional blocks at the image focussing planes.

It is still another object of the present invention to control such as arms by the distance patterns calculated basing upon the plurality of regional blocks at the image focussing planes.

It is another object of the present invention to compose a mask pattern using a plurality of striped color filters.

BRIEF DESCRIPTION OF THE DRAWINGS

FIG. 7-1 is a view for use with the explanation of mask 46;

FIG. 7-2 is a view for use with the explanation of mask 48;

DETAILED DESCRIPTION OF THE PREFERRED EMBODIMENTS

A visual sensor applicable to the present invention will first be described.

Figure 1:
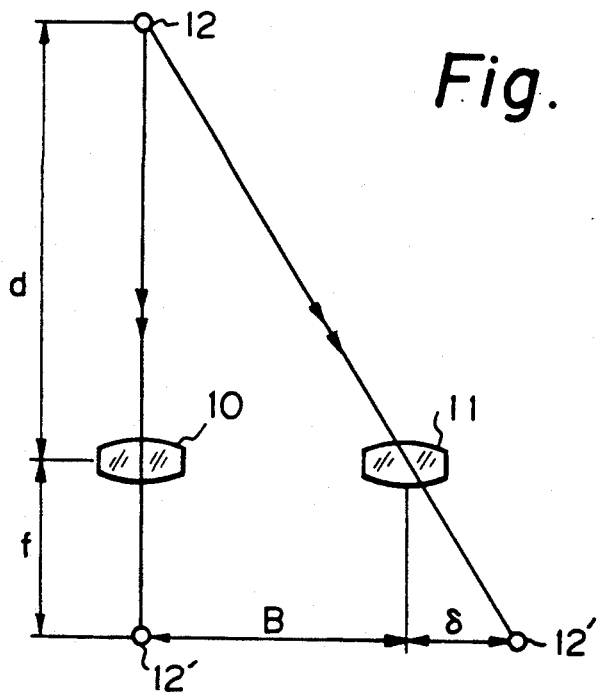
FIG. 1 is a schematic diagram showing a principle of a visual sensor.

FIG. 1 is a view showing a principle with respect to an embodiment of a visual sensor. Reference numbers 10 and 11 represent lenses with substantially low distortions. Reference character f denotes the focal distance of the lenses, d denotes a distance between an object 12 and the lens 10, B denotes a distance between the lenses 10 and 11, and $\delta$ denotes a diviation of an object image from the optical axis of the lens 11. As seen from the figure, $B/d = \delta/f$, therefore:

$$\delta = Bf/d \tag{1}$$

Figure 2:
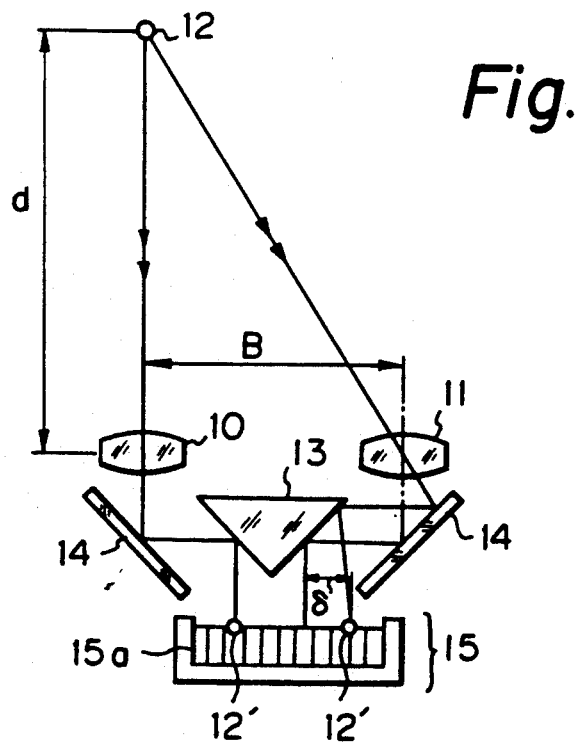
FIG. 2 shows a structure of a visual sensor.
Figure 3A:
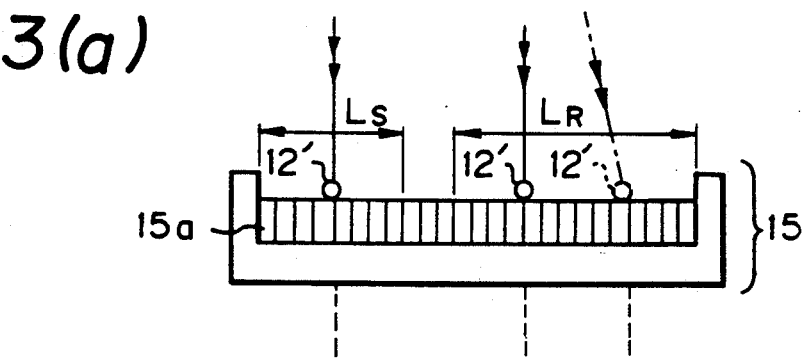
FIGS. 3(a), 3(b) and 3(c) illustrate distance signals from a visual sensor.
Figure 3B:
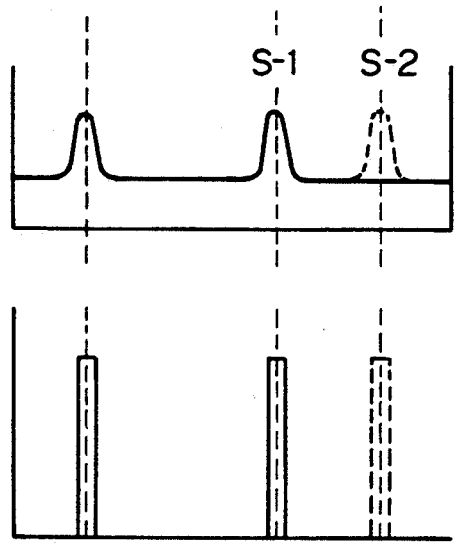
Figure 3C:
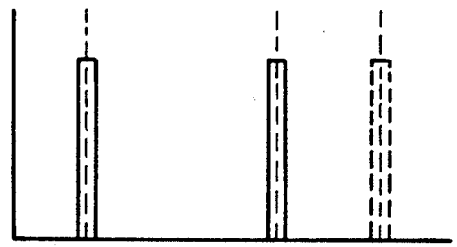

In a visual sensor shown in FIG. 2, it is so arranged that object images may be focussed onto a self-scanning type sensor array 15 (light receiving elements 15a) using a total reflection two plane mirror 13 and total reflection mirrors 14. Supplemental light from a light emission device may also be incorporated in this case. Other than the example shown in the figure, distance measurements in various directions are also possible. For example, even if a point on the object is not on the optical axis of the lens at the side of measurement field of view, the distance to a plane perpendicular to the axis and passing through the point can be calculated as $d = Bf/\delta$. The actual distance becomes $d \times \sec\theta$, wherein $\theta$ represents an angle between the object point direction and optical axis. The value d may be used for controlling the movement of an object such as a robot. The self-scanning type sensor 15 may be a CCD array and is constructed of a plurality of minutely segmented light receiving elements 15a each having a width of 10 or so. The self-scanning type sensor 15, as is well known in the art, has the function to output in the predetermined order electric signals as of a time sequence signal, each electric signal being detected by each of the plurality of minutely segmented light receiving elements 15a and corresponding in magnitude to the illumination of each picture element of an object image. The precision of measurement may be varied with the distance B between the lenses. Also, the lateral scope of the field of view may be varied with the focal length of the lens 11. With the arrangement as above, scanning outputs for two images 12' may be obtained as waveforms of signals S-1 and S-2, as specifically shown in FIG. 3(b) (also refer to FIG. 3(a)). Accordingly, the distance between the signals S-1 and S-2 corresponding to the two images can be detected (FIG. 3(c)) using an electric signal processing circuit and the distance measurement for the object is accomplished using the equation (1).

The visual sensor of the type described above detects the mutual distance between two images by using a self-scanning type sensor (hereinafter abbreviated as sensor array) and using the above distance measurement principle. In using such a visual sensor, it is necessary to clearly define the space associated with an object to be recognized, that is, in other words, it is necessary to define a measurement field of view Ls with any appropriate means as well as to define a field of view for the other image (this field of view is referred to as a reference field of view Lr). For the particular sensor shown in the above, the measurement field of view is set at the vicinity of the focussing position of the image 12', while the reference field of view is set as a range of movement of the image 12' which range varies with the distance of the object 12.

Figure 4:
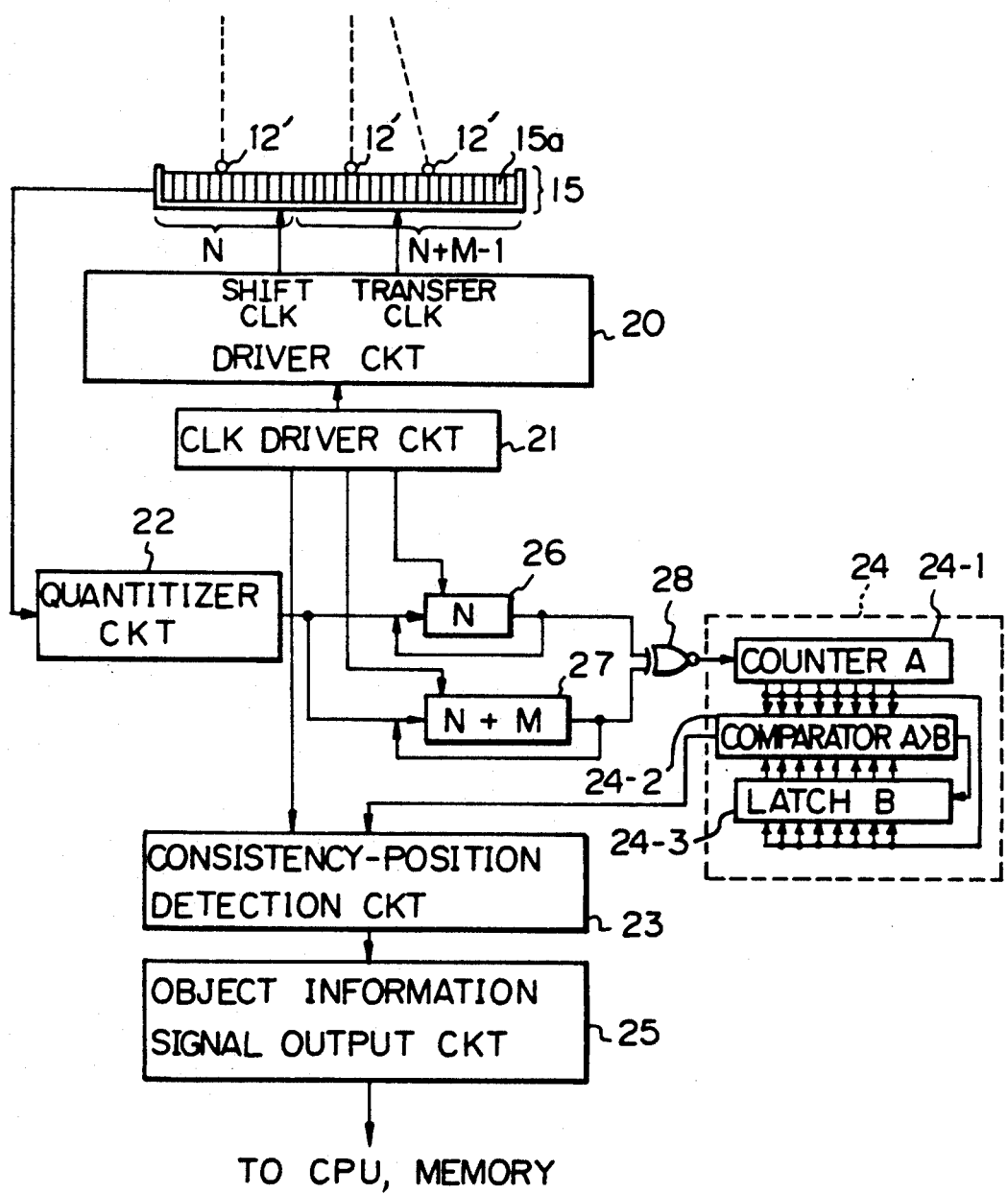
FIG. 4 is a detailed block diagram of a visual sensor.

A detailed block diagram for the purpose of discussing the visual sensor as above described is shown in FIG. 4. Reference number 15 designates the above described self scanning type sensor array such as a CCD (having N cells corresponding to the measurement field of view and N+M−1 cells corresponding to the reference field of view). The sensor array is driven by a clock driver circuit 21 and hence driver circuit 20 delivering shift clocks and transfer clocks. Data in the CCD array is quantized by means of a quantizer circuit 22 (for example, data is compared with a preset threshold value at a comparator to obtain 0 or 1 depending upon the compared result). The quantized data for the respective measurement and reference fields of view are input to shift registers 26 and 27, respectively. The quantized data are shifted upon the clocks from the clock driver circuit 21 and output to a gate 28 where the data are judged whether they are consistent with one another or not. The number of occurrences of consistency are counted by a counter 24-1 of a consistency comparison circuit 24 until N sets of such quantized data are compared. Thereafter, the output signals from the counter 24-1 are input to a latch 24-3. It is obvious that the latch circuit 24-3 has been cleared until then. After N sets of values are compared under the shift operations of the shift registers 26 and 27, the shift register 27 is shifted by 1. Then, the values from the second to N+1the order in the shift register 27 are sequentially compared with the N values in the shift register 26. Following the above two sequential comparison operations, a third sequential comparison operation is carried out in which the values from the third to N+2th order values in the shift register 27 are compared with the N values in the shift register 26. After repetition of such operations M times, the last values from the Mth to (M+N−1)th order are subjected to such comparison operation. In other words, the N values in the shift register 26 are compared with the corresponding values in the shift register 27 until the latter values are shifted M times. The number of occurrences of comparison of the N values ($\leq M$) are counted at a consistency position detection circuit 23, and also the number of outputs A > B from a comparator 24-2 in consistency number comparison circuit 24 are latched in the circuit 23. Thus, the circuit 23 can finally obtain the maximum number of outputs indicative of the maximum number of occurrences of consistency, the maximum number of outputs corresponding to a consistency position. Succeedingly, at an object information signal output circuit 25, the distance to the object is calculated in accordance with the equation (1) by using the thus obtained maximum number of consistency occurrences, i.e., the consistency position. The distance information is output to a CPU, memories, and the like.

Figure 5:
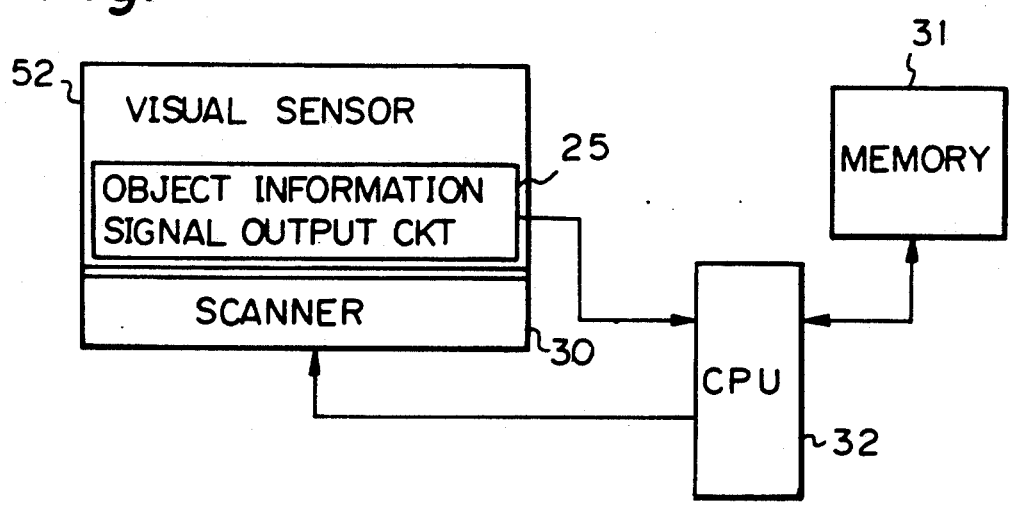
FIG. 5 is a block diagram illustrating a scanning method for a visual sensor.

Next, the scanning method for the visual sensor will be described. FIG. 5 is a control block diagram for the visual sensor. Reference number 30 represents a scanner for effecting a selective scanning of the visual sensor, reference number 31 represents a memory device for storing patterns for the distance information or the like, and reference number 32 represents a CPU for controlling the sensor and executing calculation operations and the like.

Figure 6:
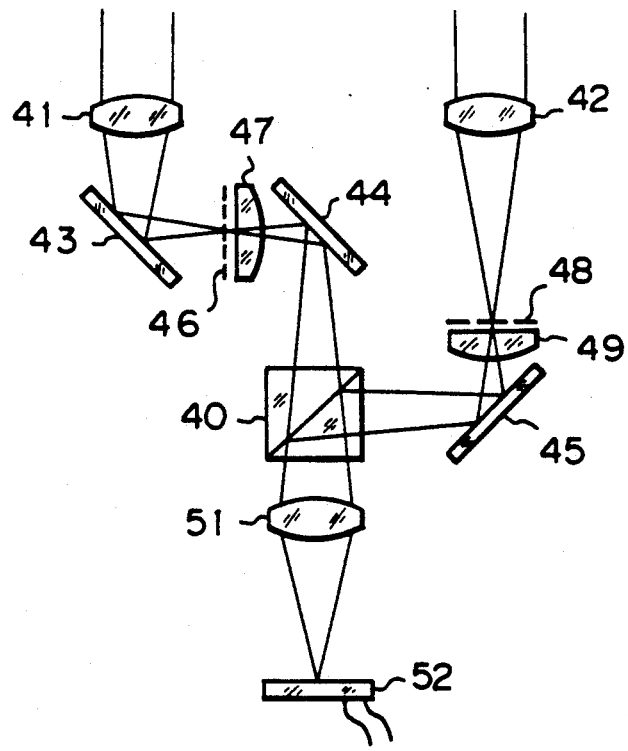
FIG. 6 is a structural arrangement of a visual sensor according to an embodiment of the present invention.

Keeping the foregoing description in mind, an embodiment incorporating the present invention will now be described. FIG. 6 is a block diagram showing an arrangement of a visual sensor according to the embodiment. Reference numbers 41 and 42 represent objective lenses, reference numbers 43, 44, and 45 represent total reflection mirrors, reference number 46 represents a positive mask, reference number 48 represents a negative mask, reference numbers 47 and 49 represent condenser lenses, reference number 40 represents a semi-transparent mirror, reference number 51 represents a focussing lens, and reference number 52 represents a photosensor such as a CCD which uses the picture element as a unit for reading out every one line image.

Figures 1, 7:
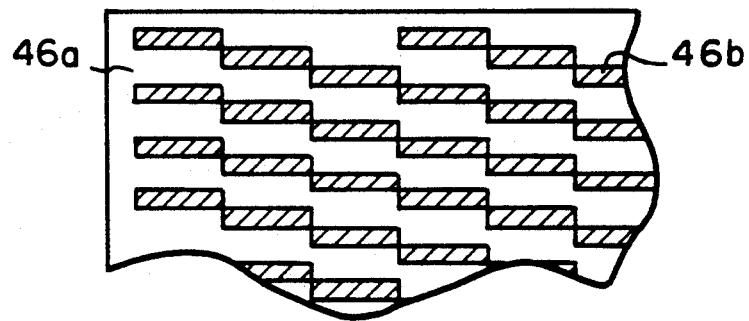
Figures 2, 7:
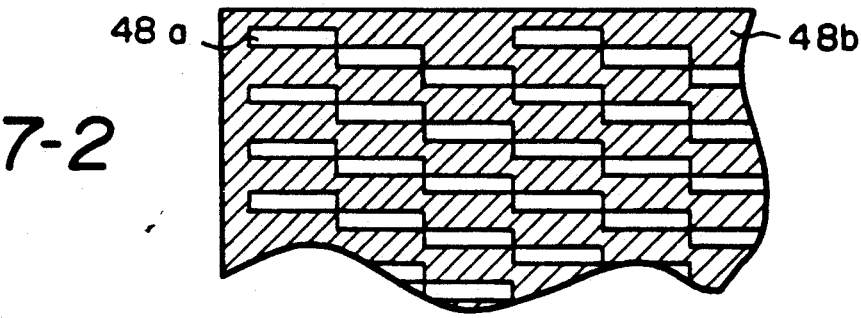

With the construction as above, the images in the environments to be recognized are focussed, through the objective lenses 41 and 42 disposed separately from one another by a preset distance, near at the masks 46 and 48, respectively. The mask 46, a portion of which is shown enlarged in FIG. 7-1, is constructed, e.g., of opaque sections 46b disposed in the form of a mosaic on a transparent glass plate. The mask 48, as shown in FIG. 7-2, is constructed as of the type that the transparent and opaque sections 46a and 46b of the mask 46 are reversed, wherein reference 48a denotes a transparent section and reference 48b denotes an opaque section.

Figure 8:
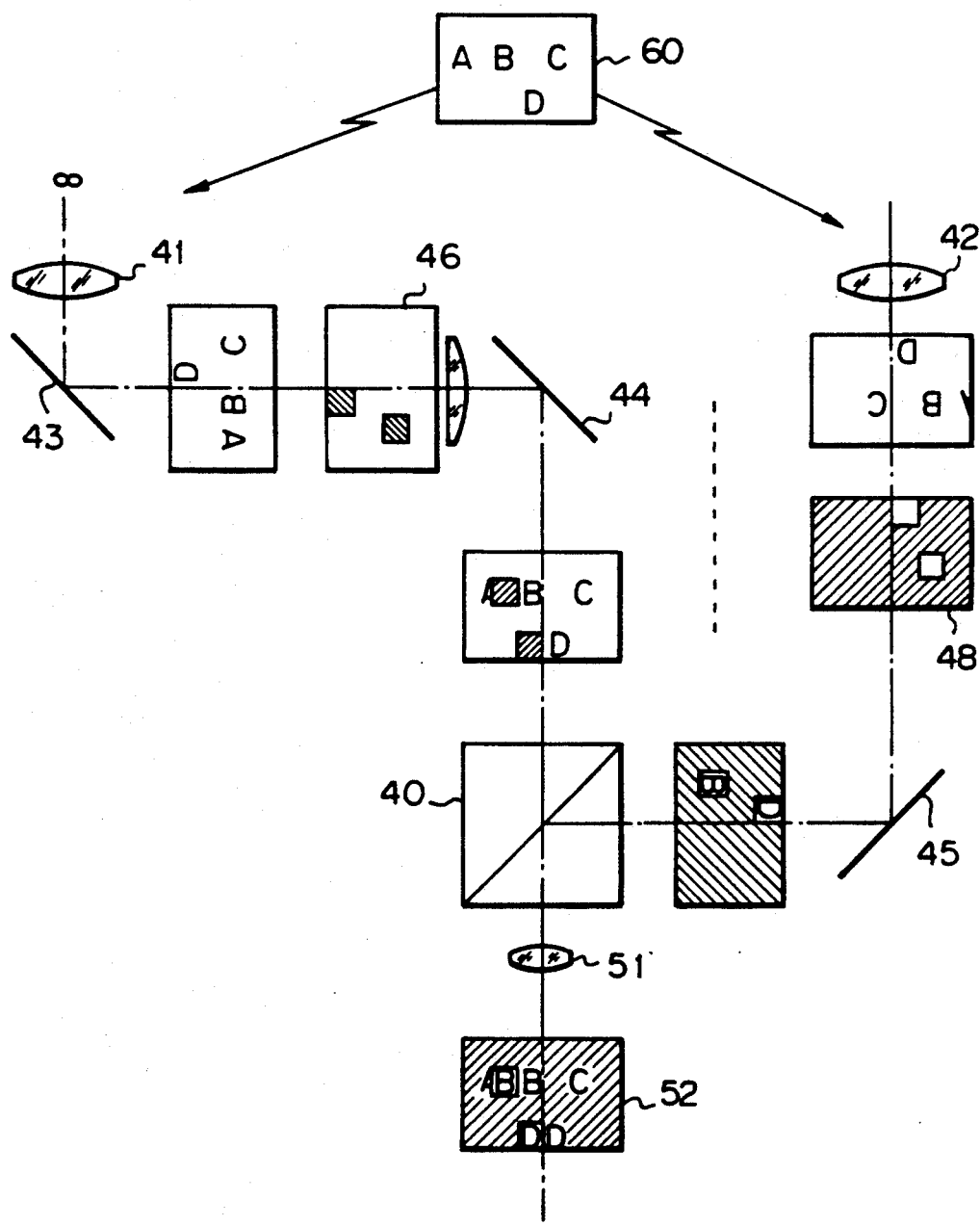
FIG. 8 is a diagrammatic view of the visual sensor.

FIG. 8 is a diagrammatic view of the visual sensor shown in FIG. 6. Reference number 60 represents an object (the environments). Although the object is shown in two dimensions, the actual object is a three dimensional object. Reference numbers 41 and 42 represent objective lenses corresponding to those in FIG. 6, similarly reference numbers 43, 44, and 45 represent total reflection mirrors, reference number 46 represents a positive mask, reference number 48 represents a negative mask, reference number 40 represents a semi-transparent mirror, and reference number 52 represents a CCD (three lines in FIG. 8) of the photosensor reading one line image using the picture element as a unit, and also represents an object image focussed on the CCD through the lens 51. The photosensor may not be a CCD, but it may be an area sensor. Furthermore, the number of lines is not limited to three. The masks 46 and 48 ar fabricated such that the transparent sections of the one mask coincide with the opaque sections of the other mask, and vice versa. The object images here are arranged such that identical portions of the two images from the respective lenses 41 and 42 (in the present embodiment, two identical characters Bs and Ds exist on the CCD 52) are focussed separately along scanning lines. As a result, identical portions of the two images passing through the two optical passages of the respective lenses 41 and 42 are disposed laterally of the photosensor 52 without being superposed one upon the other. If the direction of the scanning lines relative to the photosensor 52 is made in alignment with the direction of the mosaic masks, then the identical portions of the object images from both optical passages of the lenses 41 and 42 can be projected side by side onto the same scanning lines of the photosensor, as in Bs and Ds of FIG. 8. By using the same object images aligned side by side and obtained as above, it is possible to access the distance information in accordance with the distance measurement principle as shown with FIGS. 1 to 4.

Figure 9:
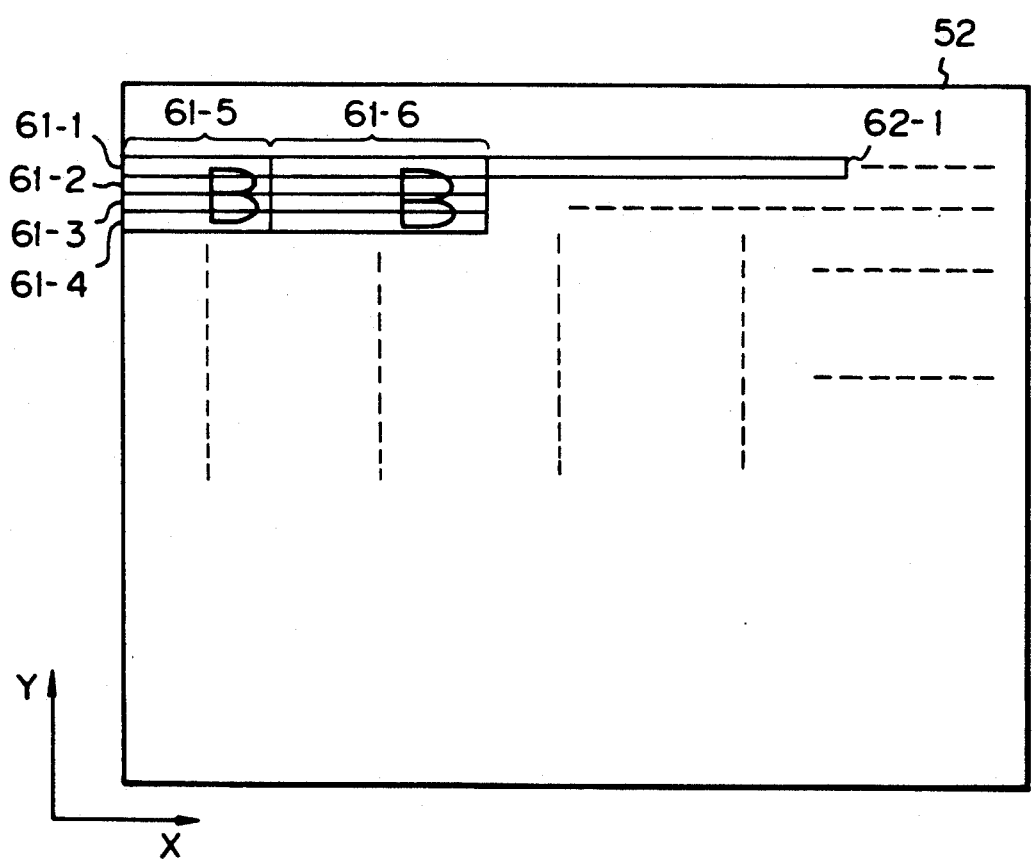
FIG. 9 is a view for use with the explanation of scanning blocks on photosensor 52.

Next, the CCD or photosensor 52 will be described. FIG. 9 shows a part of an image projected upon the CCD, wherein respective blocks 61-1, 61-2, 61-3 and 61-4 each correspond to the sensor array 15 described with FIGS. 2 to 4. In FIG. 9, although object images "B" are shown projected over four scanning lines on the CCD 52, the number of scanning lines may take any number depending upon the reading-out precision, speed, and the like. It is noted here that reference number 61-5 corresponds to the measurement field of view as discussed with FIG. 4 and reference number 61-6 corresponds to the reference field of view. In the present invention, the measurement field of view 61 5 has 32 bits, while the reference field of view 61-6 has 94 bits. Thus, the number of divisions becomes 62 or (94−32). The number of division of divisions may be varied as desired with the distance measurement precision. The dimension of the CCD 52 surface is 6.6 mm in the Y direction and 8.8 mm in the X direction. The scanning lines are composed of 757 lines in the X direction and 245 lines in the Y direction. The scanning line composition, however, is not limited to such. Further, it is apparent that in FIG. 9 various not shown blocks exist in the X and Y directions, which are similar to those represented by 61-1, 61 2, 61-3, 61-4, 62-1.

Next, the switching control for scanning the CCD 52 including the plurality of blocks as above will be described. As particularly described with FIG. 4, in order to obtain the distance information for one block, N ×M clocks are required. By counting the number of clocks, the clock driver circuit 21 shown in FIG. 4 controls the switching in scanning a definite area in the manner that the example the block 61-1 in FIG. 9 is switched to the block 62-1 and to the block 61-2 and so on.

Figure 10:
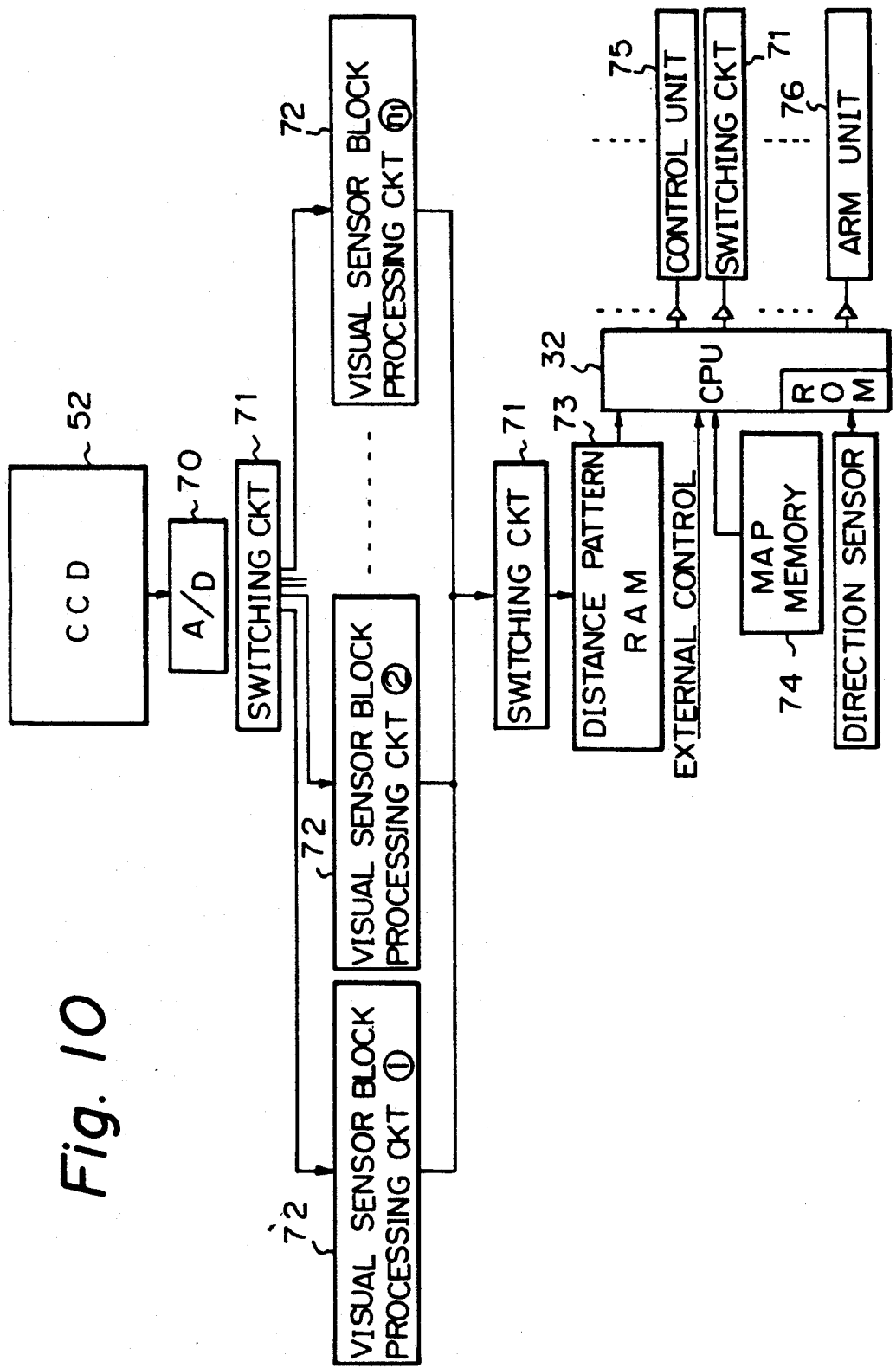
FIG. 10 is a system block diagram of a robot.

FIG. 10 shows a system block diagram for a robot employing the previously discussed visual sensor. Reference number 52 represents a CCD photosensor corresponding to that described above. Reference number 70 represents an A/D converter, and reference number 71 represents a switching circuit for selecting a sensor block in the CCD 52 and obtaining the object distance information in a visual sensor block processing circuit 72. The detected object distance information are written into RAMs of a distance pattern RAM unit 73 as a distance pattern. Reference number 32 represents a CPU, and reference number 74 represents a memory map. The memory map 74 stores the late distance pattern or instruction map and compares the late distance pattern in the map memory 74 with the present distance pattern to thereby effect the most suitable arm control, movement control or the like. The CPU may be of a non-Neumann type computer having plural processors in which various data are processed simultaneously and parallel in the respective processors. Terminals may be provided to which command signals are supplied exteriorly. Moreover, control and arm units 75 and 76 may utilize the informations from sensors for the movement direction, speed, distance and the like, or the informations from data of the calculation operation unit and the above distance pattern.

In the above embodiment, a plurality of visual sensor block processing circuits have been provided in parallel in order to make the processing time compatible with the CCD scanning time. The plural and parallel circuits, however, may be dispensed with if the distance calculation processing becomes faster or the CCD scanning speed is properly adjusted. Further, the order of the A/D converter 70 and switching circuit 71 may be reversed.

Since distance information can be obtained, other applications to sensors are possible such as for getting away from or capturing a high speed flying object, or for keeping away from obstacles against an automobile or the like, and the applications of the present invention should not be limited thereto.

The distribution of distances to an environmental object within a field of view can be measured with a high resolving power, particularly in the lateral direction when compared with the ultrasonic measurement, without incorporating mechanically movable parts. In addition, the images of the same objective passing through the two optical passages are focussed side by side on the photosensor. From the above two reasons, the problem that in a stereo method (the Journal of the Institute of Television Engineers in Japan, Vol.34, No. 3, 1980, p. 211), mutual references of corresponding points have been considered difficult, can be solved. It is possible to process the operations parallel and hence to mount a non-Neumann type computer. A high speed processing required for robots is also possible. As described in detail, measuring the distribution of distances is effective in three-dimensionally recognizing the objective, so that particular and practical applications such as eyes of a robot or a sensor for a walking aid for the blind, are possible.

As described above in detail, it is possible to provide an object information processing apparatus which can recognize an object as a three dimensional configuration using a distance related pattern and a simple circuit arrangement.

Figure 11:
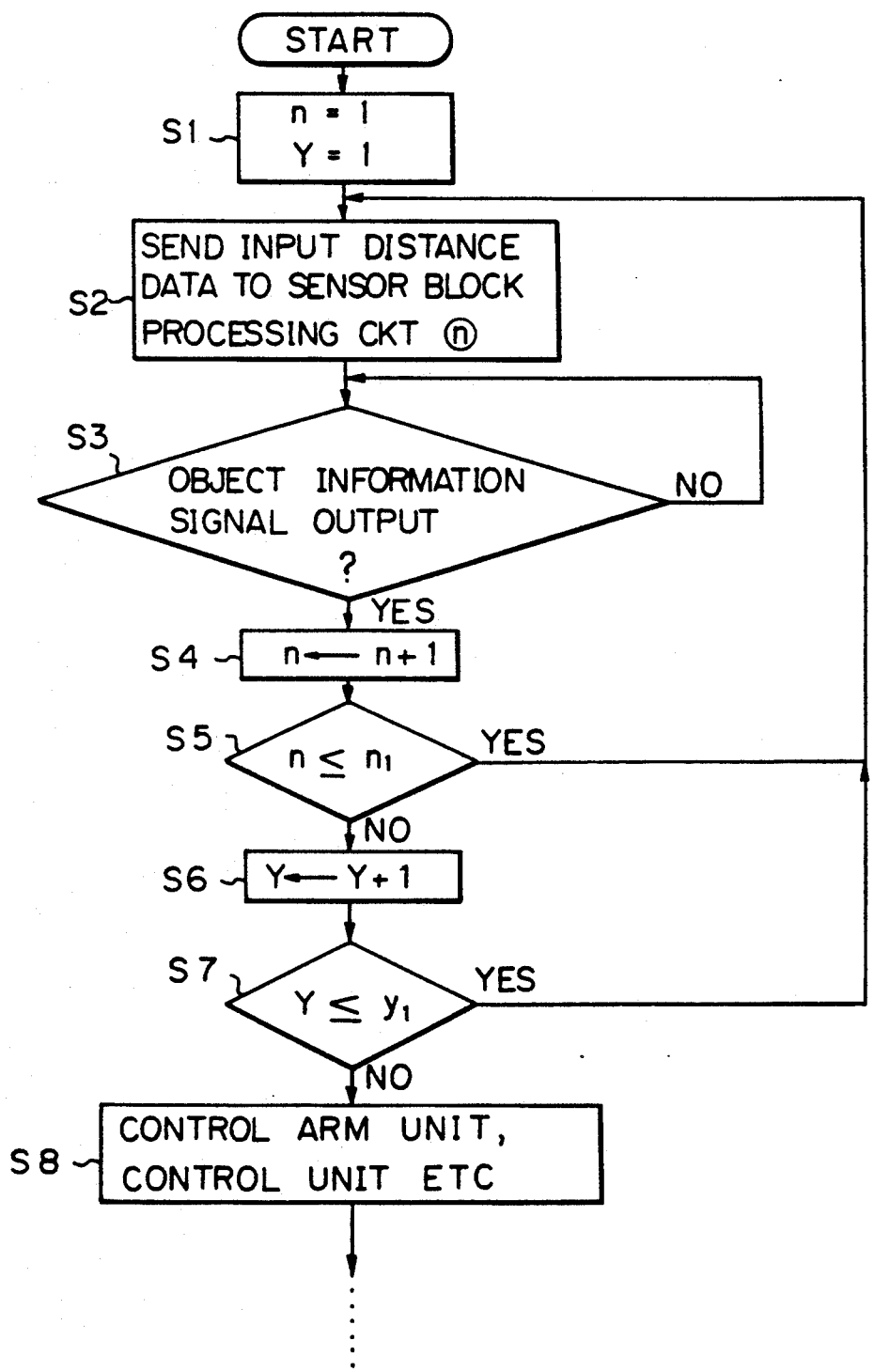
FIG. 11 is a part of a control flow chart for the robot.

Referring further to FIG. 11, a control flow chart for a robot capable of being mounted on the apparatus according to the present invention will briefly be described in part. The program for the flow chart is stored for example in ROMs of the CPU 32. The visual sensor blocks such as represented by 61 1 on the CCD of FIG. 9 respectively correspond to the visual sensor block processing circuits 72 of FIG. 10. Two visual sensor block circuits 72 can suffice at the minimum, although the number of circuits depends upon the processing times for changing the image data block and for the visual sensor block processing circuit 72. In the present example, the number of processing circuits for one line on the CCD 52 is assumed here n1 (the number of visual sensor blocks is also assumed n1 ). At step 1 of FIG. 11, first it is assumed n=1. At step 2, distance data in the block (1) (among n1 blocks on one line) of the CCD is supplied to the sensor block processing circuit (1) (among n1 circuits on one line, n1 corresponding to the number of visual sensor blocks). Next, at step 3, the object information signal (1) is output from the visual sensor block processing circuit (1) as shown in FIG. 4 and stored in the distance pattern RAM 72 as shown in FIG. 10. This process takes for example about 3 ms, and its judgement may be carried out using a timer. At step 4, in order to process the distance data from the next block (2), n←n+1 is performed. In this example, since n ≦n1 at step 5, step 2 resumes to repeat the above processes. Upon completion of the processes for one line, at step 5 the negative direction NO follows. At step 6, Y←Y+1 is performed so as to proceed with the next line processing. At step 7, whether y1 lines have been chacked, i.e., whether one frame has been checked (assuming that the CCD 52 has y1 lines in the direction of Y in FIG. 9), is judged. At step 7, if the one frame processings for the distance data are not still completed, step 2 resumes to perform the processings for the remaining distance data.

At step 7, if the state is not Y≦y1, i.e., in the case that the processings for the distance data for the one frame of the CCD have already finished, then in the distance pattern RAM unit 73 of FIG. 10, a distance pattern of the one frame has been completed. At step 8, basing upon the distance pattern data for the one or several frames on the CCD, and in addition, basing upon the data from the map memory 74 of FIG. 10, directional sensor such as an optical fiber gyro, or the like, various control units 75 and arm units 76 are controlled e.g., the direction along which no obstacles are found is determined basing upon the distance pattern data to thereby move the robot body in that direction.

Last of all, the change of color of an object may be employed as information for calculating the distances. Specifically, even an object having the same brightness over the whole surface can adopt the above distance measurement so long as it has a change in hue and saturation. By using a striped mask pattern instead of the mosaic mask pattern, the position alignment is readily performed and advantageous effects can be enjoyed when compared with the case using the mosaic mask pattern. The more detailed description will be given in the following.

Figure 12:
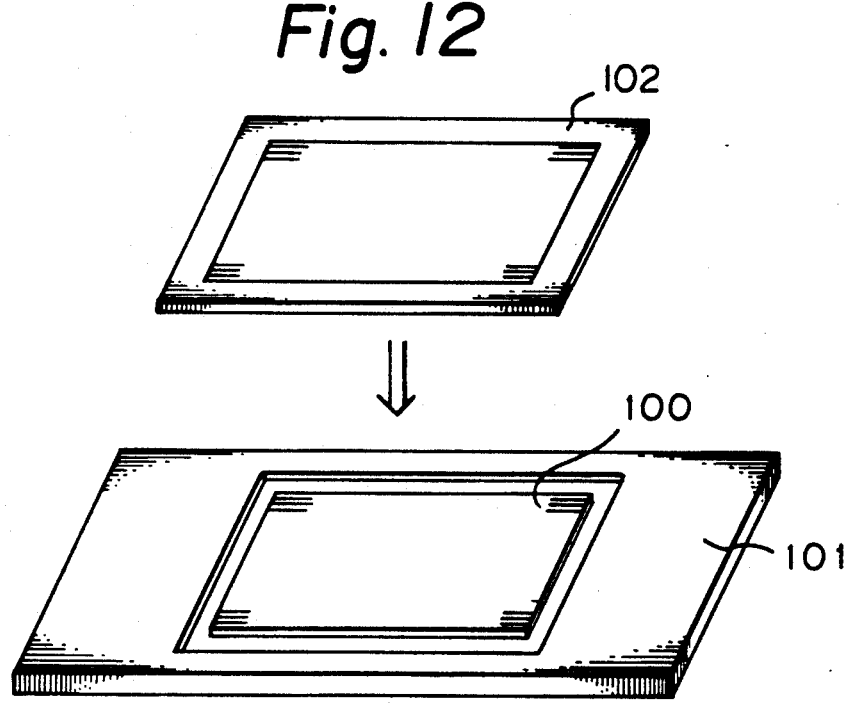
FIG. 12 shows an arrangement of a photosensor and mask pattern.
Figure 13:
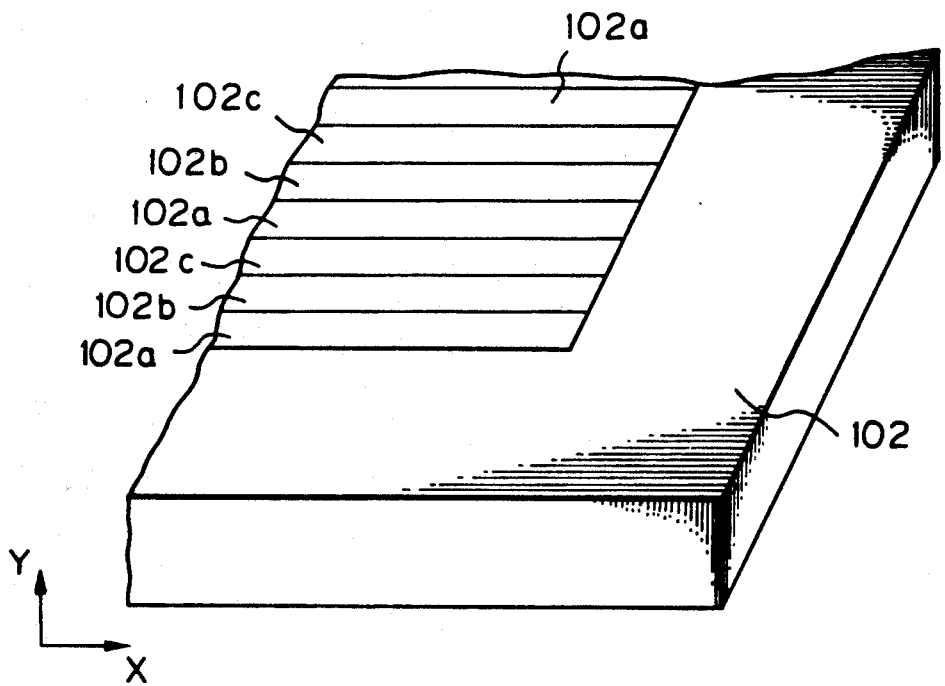
FIG. 13 is an enlarged view of the mask pattern.

Instead of the mask patterns 46 and 48 of FIG. 6, or the mask patterns of FIGS. 7-1 and 7-2, in the present example, the pattern as shown in FIG. 12 is used. Reference 101a denotes a base, reference number 100 denotes a two dimensional sensor such as a CCD, and reference number 102 denotes a color filter. FIG. 13 shows an enlarged portion of the mask pattern or color filter pattern. References 102a, 102b, 102c denote stripes having three colors, i.e., red, green and blue, or in addition transparent. The stripes are cyclically juxtaposed each having the same width as that of the scanning line. The distances are calculated according to the above processings, taking into consideration the mutual positions between the object images obtained through the different optical passages and projected upon the same scanning line of the photosensor constructed as in the present example. Therefore, the information under comparison is all associated with lights passed through the same colored filter. In addition, in the adjacent scanning lines in the direction of the subscanning direction (Y direction in FIGS. 9 and 13), the distances of the object images through the different colored filter are calculated. Therefore, the object projected within the field of view onto the plural scanning lines is subjected to distance measurement with different color resolving powers.

The filter (mask pattern) may directly be evaporated onto the photosensor by means of evaporation or sputtering. In the case that the sensitivity of the photosensor is effective only for those other than visual lights, filters for separating infrared rays and ultraviolet rays may be employed.

As seen from the above detailed description, even if the change in brightness is small, the distances to the object having a chromaticity change can readily be measured to form a more correct distance pattern.

What we claim is:

1. An object information processing apparatus comprising:

light transmission means, including a plurality of lenses having optical axes which are fixedly parallel with respect to each other, for transmitting light information substantially simultaneously from each of a plurality of object points spaced from said apparatus by different distances and in different directions, via a plurality of optical passages onto a focusing plane;

division means for optically dividing said focusing plane into a plurality of blocks corresponding to each of said object points in order to optically produce distance information, said division means including a plurality of complimentary masks each disposed in one of said optical passages; and deriving means for deriving a plurality of distance information corresponding respectively to the plurality of object points from said plurality of blocks.

2. An object information processing apparatus according to claim 1, in which said light transmission means includes lens means and reflection mirrors.

3. An object information processing apparatus according to claim 1, in which said division means is a plurality of mask patterns each having a different predetermined pattern, said division means being mounted on a part of the respective optical passages through which light is transmitted in said light transmission means.

4. An object information processing apparatus according to claim 3, in which said mask pattern is made of a striped color filter having a plurality of colors.

5. An object information processing apparatus comprising:

focusing means, including a plurality of lenses having optical axes which are fixedly parallel with respect to each other, for focusing light information substantially simultaneously from a plurality of object points spaced from said apparatus by different distances and in different directions;

light transmission means for transmitting said light information substantially simultaneously from said object points to said focusing means via first and second optical paths for each of said object points;

two complimentary mask means provided respectively in said first and second optical paths in said light transmission means and formed respectively with predetermined patterns which are different from each other; and deriving means for deriving a plurality of distance information corresponding respectively to the plurality of said object points in accordance with the light information passing through said two masks means, respectively.

6. An object information processing apparatus according to claim 5, in which said focussing means is a CCD.

7. An object information processing apparatus according to claim 5, in which said light transmission means includes lens means and reflection mirrors.

8. An object information processing apparatus comprising:

focusing means, including a plurality of lenses having optical axes which are fixedly parallel with respect to each other, for focussing a plurality of light information substantially simultaneously from a corresponding plurality of object points, spaced from said apparatus by different distances and in different directions, onto a plurality of blocks, said focussing means directing light from said object points via first and second optical passages, said first and second optical passages respectively including first and second complimentary masks;

deriving means for deriving a plurality of distance information corresponding respectively to the plurality of light information each focussed on any one of said blocks of said focussing means; and control means for controlling a peripheral device connected to said apparatus based upon a distance pattern which is an output data from said deriving means.

9. An object information processing apparatus according to claim 8, in which said focussing means is a CCD.

10. An object information processing apparatus according to claim 8, in which said deriving means derives a distance between said peripheral device and said object point.

11. An object information processing apparatus according to claim 10, in which said deriving means includes a quantizer circuit, clock control unit, counter unit, and comparator unit.

12. An object information processing apparatus according to claim 8, in which said control means controls an arm and the like based upon said distance pattern.

13. An apparatus according to claim 1, further comprising control means for controlling a peripheral device connected to said apparatus based upon a distance pattern which is an output data from said deriving means.

14. An apparatus according to claim 5, further comprising control means for controlling a peripheral device connected to said apparatus based upon a distance pattern which is an output data from said deriving means.

15. An apparatus according to claim 8, further comprising control means for controlling a peripheral device connected to said apparatus based upon a distance pattern which is an output data from said changing means.

16. A method of processing object information, comprising the steps of:

transmitting light through a plurality of lenses substantially simultaneously from each of a plurality of object points spaced from the lenses by different distances and in different directions from the lenses, via a plurality of optical passages onto a focusing plane, the lenses having optical axes which are parallel with respect to each other;

optically dividing said focusing plane into a plurality of blocks corresponding to each of said object points in order to produce distance information, using a division means having a plurality of complimentary masks each disposed in one of said optical passages; and deriving a plurality of distance information corresponding respectively to the plurality of object points from said plurality of blocks using deriving means.

17. A method according to claim 1, wherein said step of dividing said focusing plane includes the step of placing one complimentary mask in each of said optical passages, said complimentary masks having different predetermined patterns.

18. A method according to claim 17, wherein said step of dividing said focusing plane includes the step of disposing a complimentary mask having a stripped color filter with a plurality of colors in each said optical passage.

19. A method of processing object information, comprising the steps of:

transmitting, through a plurality of lenses, light information substantially simultaneously from a plurality of object points to said lenses via first and second optical paths, said plurality of object points being spaced from the lenses by different distances and in different directions from the lenses, the lenses having optical axes which are parallel with respect to each other;

disposing two complimentary mask means, one in each of said first and second optical paths, the complimentary mask means formed respectively with different predetermined patterns; and deriving a plurality of distance information corresponding respectively to the plurality of object points in accordance with the light information passing through said two complimentary mask means, respectively.

20. A method according to claim 19, further including the step of disposing a CCD to intercept light information passing through said first and second optical paths.

21. A method according to claim 19, further including the step of disposing reflection mirrors in each of said first and second optical paths for reflecting light information passing through said plurality of lenses.

22. A method of processing object information in which a plurality of lenses having optical axes which are fixedly parallel with respect to each other is disposed for focusing light information passing therethrough, the light information passing through the lenses substantially simultaneously from a plurality of object points of a solid body in the vicinity of the lenses, said points being spaced from the lenses by different distances and in different directions, said light information passing through first and second optical passages, each passage including at least one of said plurality of lenses, said method comprising the steps of:

functionally dividing the light information passing through said first and second optical passages into a plurality of blocks by disposing first and second complimentary mask, respectively, in said first and second optical passages; and reading out respective light information focused in the respective blocks, and changing one block to another whose light information is to be used to calculate distance information in order to obtain a plurality of distance information corresponding respectively to the plurality of object points on the solid body in response to the distance information.

23. A method according to claim 22, further comprising the step of disposing a CCD for receiving light passing through said first and second optical passages.

24. A method according to claim 22, wherein said step of functionally dividing includes the step of disposing first and second complimentary masks which have different predetermined patterns.

25. A method according to claim 24, which said step of functionally dividing includes the step of disposing first and second complimentary masks each of which includes a color filter having a plurality of colors.

26. A method of processing object information in which a plurality of lenses having optical axes which are fixedly parallel with respect to each other is disposed for focusing light information, said light information passing through the plurality of lenses substantially simultaneously from a plurality of object points spaced from the lenses by different distances and in different directions, said light information being focused onto a plurality of blocks, said light from said object points being focused onto said plurality of blocks via first and second optical passages, said method comprising the steps of disposing first and second complimentary masks respectively in said first and second optical passages;

deriving a plurality of distance information corresponding respectively to a plurality of light information each focused on any one of said blocks; and controlling a peripheral device connected to said apparatus based upon a distance pattern which is provided from said deriving step.

27. A method according to claim 26, wherein said deriving step includes the step of disposing a CCD to receive light information passing through said first and second optical passages.

28. A method according to claim 26, wherein said deriving step includes the step of deriving a distance between said peripheral device and at least one of said object points.

29. A method according to claim 28, wherein said deriving step includes the step of disposing a CCD to receive light information passing through said first and second optical passages, and coupling a quantizer circuit, a clock control unit, a counter unit, and a comparator unit to said CCD.

30. A method according to claim 26, wherein said step of controlling a peripheral device includes the step of controlling an arm.

31. A method according to claim 16, further comprising the step of controlling a peripheral device connected to said lenses based on a distance pattern determined from said deriving step.

32. A method according to claim 19, further comprising the step of controlling a peripheral device connected to said lenses based on a distance pattern determined from said deriving step.

33. An apparatus according to claim 22, further comprising the step of controlling a peripheral device connected to said lenses based on a distance pattern determined from said reading-out step.

* * * * *

UNITED STATES PATENT AND TRADEMARK OFFICE
CERTIFICATE OF CORRECTION

PATENT NO. : 5,222,156

DATED : June 22, 1993

INVENTOR(S) : KANEHIRO SORIMACHI, ET AL.

Page 1 of 5

It is certified that error appears in the above-indentified patent and that said Letters Patent is hereby corrected as shown below:

IN THE DRAWINGS
SHEET 3, FIGURE 4

"QUANTITIZER" should read --QUANTIZER--.

Title page, item
[57] ABSTRACT

Line 10, "ture" should read --tue--.

COLUMN 1

Line 33, "real time" should read --real-time--.
Line 41, "basing" should read --based--.
Line 46, "three dimensional" should read --three-dimensional--.
Line 67, "basing" should read --based--.

COLUMN 2

Line 18, "basing" should read --based--.

COLUMN 3

Line 51, "self scanning" should read --self-scanning--.

UNITED STATES PATENT AND TRADEMARK OFFICE
CERTIFICATE OF CORRECTION

PATENT NO. : 5,222,156
DATED : June 22, 1993
INVENTOR(S) : KANEHIRO SORIMACHI, ET AL.

It is certified that error appears in the above-indentified patent and that said Letters Patent is hereby corrected as shown below:

COLUMN 4

Line 6, "N+1the" should read --N+1th--.
Line 22, "consistency" should read --the consistency--.
Line 64, "plate." should read --plate 46a.--.

COLUMN 5

Line 4, "three" should read -- three- --.
Line 18, "ar" should read --are--.
Line 51, "view 61 5" should read --view 61-5--.
Line 54, "division of" should be deleted.
Line 63, "61 2," should read --61-2,--.

COLUMN 6

Line 68, "three dimensional" should read --three-dimensional--.

UNITED STATES PATENT AND TRADEMARK OFFICE
CERTIFICATE OF CORRECTION

PATENT NO. : 5,222,156
DATED : June 22, 1993
INVENTOR(S) : KANEHIRO SORIMACHI, ET AL.

It is certified that error appears in the above-indentified patent and that said Letters Patent is hereby corrected as shown below:

COLUMN 7

Line 8, "61 1" should read --61-1--.
    Line 45, "basing" should read --based--.
    Line 47, "basing" should read --based--.
    Line 50, "controlled e.g.," should read --controlled: e.g.,--.
    Line 52, "basing" should read --based--.

COLUMN 8

Line 1, "two dimensional" should read --two-dimensional--.
    Line 48, "complimentary" should read --complementary--.

COLUMN 9

Line 9, "complimentary" should read --complementary--.
    Line 17, "masks" should read --mask--.
    Line 37, "complimentary" should read --complementary--.

UNITED STATES PATENT AND TRADEMARK OFFICE
CERTIFICATE OF CORRECTION

PATENT NO. : 5,222,156

DATED : June 22, 1993

INVENTOR(S) : KANEHIRO SORIMACHI, ET AL.

It is certified that error appears in the above-indentified patent and that said Letters Patent is hereby corrected as shown below:

COLUMN 10

Lines 3-7, Claim 15 should be deleted.
Line 20, "compli-" should read --comple- --.
Line 29, "complimentary" should read --complementary--.
Line 30, "complimentary" should read --complementary--.
Line 34, "complimentary" should read --complementary--; and "stripped" should read --striped--.
Line 47, "complimentary" should read --complementary--.
Line 49, "complimentary" should read --complementary--.
Line 54, "complimentary" should read --complementary--.

COLUMN 11

Line 11, "complimentary mask," should read --complementary masks,--.
Line 25, "complimentary" should read --complementary--.
Line 27, "which" should read --wherein--.
Line 29, "complimentary" should read --complementary--.
--two-dimensional--.

UNITED STATES PATENT AND TRADEMARK OFFICE
CERTIFICATE OF CORRECTION

PATENT NO. : 5,222,156
DATED : June 22, 1993
INVENTOR(S) : KANEHIRO SORIMACHI, ET AL.

It is certified that error appears in the above-indentified patent and that said Letters Patent is hereby corrected as shown below:

COLUMN 12

Line 2, "of" should read --of:--.
Line 3, "complimentary" should read --complementary--.

Signed and Sealed this

Twenty-sixth Day of April, 1994

Attest:

BRUCE LEHMAN

Attesting Officer

Commissioner of Patents and Trademarks